April 20, 1926.

T. C. O'LOUGHLIN 1,581,138

ADJUSTABLE CLAMP

Filed March 28, 1924

INVENTOR.
Thomas C. O'Loughlin
BY
Thos. L. Donnelly
ATTORNEY.

Patented Apr. 20, 1926.

1,581,138

UNITED STATES PATENT OFFICE.

THOMAS C. O'LOUGHLIN, OF DETROIT, MICHIGAN.

ADJUSTABLE CLAMP.

Application filed March 28, 1924. Serial No. 702,615.

*To all whom it may concern:*

Be it known that I, THOMAS C. O'LOUGH-LIN, a citizen of the United States, residing at Detroit, in the county of Wayne and State of Michigan, have invented a new and useful Improvement in an Adjustable Clamp, of which the following is a specification.

My invention relates to a new and useful improvement in a clamp and has for its object the provision of a clamp which will be simple in structure, economical of manufacture, highly efficient in use and adapted for adjustment to various lengths.

Another object of the invention is the provision of an adjustable clamp which may be folded into very compact form.

Another object of the invention is the provision of a clamp having a foldable arm carrying abutment members at the opposite sides or ends.

Another object of the invention is the provision of a clamp having the arm which extends between the engaging blocks adapted for folding upon itself to regulate the capacity of the clamp.

Other objects will appear hereinafter.

The invention consists in the combination and arrangement of parts hereinafter described and claimed.

Figure 1:
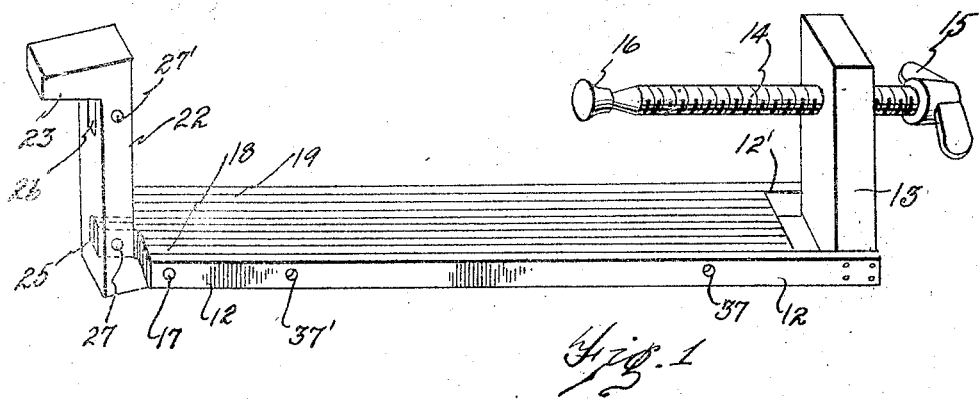
Figure 2:
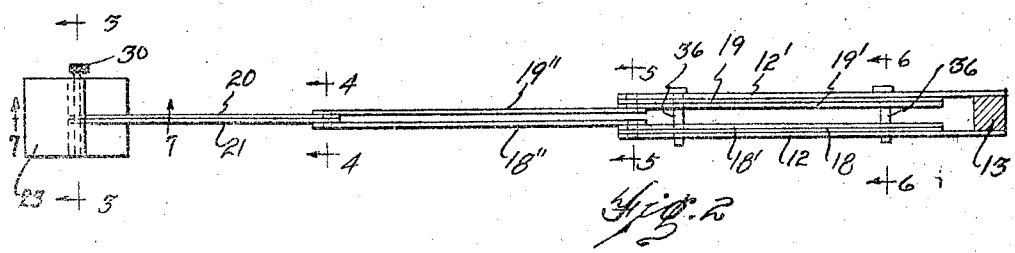
Figure 3:
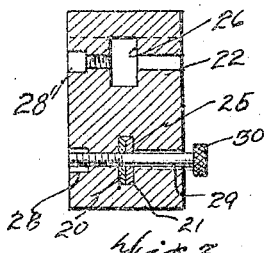
Figure 4:
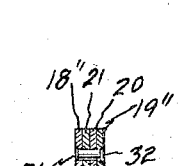
Figure 5:
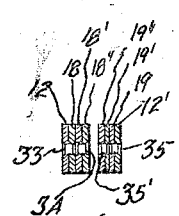
Figure 6:
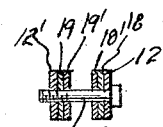
Figure 7:
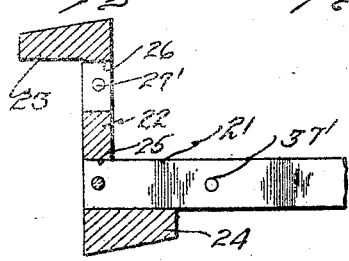

The invention will be best understood from a reference to the accompanying drawings which form a part of this specification and in which, Fig. 1 is a perspective view of the invention, Fig. 2 is a top plan view of the invention in extended form with parts in section, Fig. 3 is a sectional view taken on substantially line 3—3 of Fig. 2, Fig. 4 is a sectional view taken on substantially line 4—4 of Fig. 2, Fig. 5 is a sectional view taken on substantially line 5—5 of Fig. 2, Fig. 6 is a sectional view taken on substantially line 6—6 of Fig. 2, and, Fig. 7 is a fragmentary sectional view taken on substantially line 7—7 of Fig. 2.

The invention is adapted for the various uses for which a clamp is used and is particularly adapted for use as a carpenter's clamp, or other tradesman who has use for a portable clamp. The tradesman in going about from job to job and from one place to another, on the same job, has to carry with him clamps of varying sizes to accommodate the work which he is engaged on. Some of the clamps, owing to their capacity, have a long arm extending between the engaging ends, which makes the clamp heavy and cumbersome to handle. To provide a clamp of varying capacities which will be light and substantial and at the same time permit the folding of the arm extending between the engaging ends is the purpose of the present invention.

My invention in its preferred form comprises a block 13, to the opposite sides of which are attached one end of rails 12 and 12'. Threaded into an opening formed in the block 13 is a screw 14, having the operating wing nut 15 at one end thereof and the swivel foot 16 at the opposite end thereof. The free end of the rail 12 is pivotally connected to one end of an arm 18, as at 17. The other end of the member 18 is pivotally connected to one end of an arm 18', the opposite end of which is pivotally connected to one end of the arm 18", the opposite end of which is pivotally connected to one end of the arm 21. The free end of the rail 12' is pivotally connected by means of a rivet to one end of an arm 19, the opposite end of which is pivotally connected to one end of an arm 19', the opposite end of which is pivotally connected to one end of an arm 19", the opposite end of which is pivotally connected to one end of the arm 20.

An engaging block 22 is provided with a reenforcing portion 23 and 24, at opposite sides thereof and projecting in opposite directions. The block 22 is provided with a narrow opening 25 and a wider opening 26 formed therein, at opposite ends of the block. The ends of the members 20 and 21 are adapted for projecting into these openings. The block 22 is provided with openings 27 and 27' which project through the block 22 and into the openings 25 and 26 respectively. A nut 28 or 28' is mounted in one end of the openings 27 and 27' respectively and provided with an interiorly threaded bore to receive the threaded end of the bolt 29 having the knurled knob 30 mounted thereon. The ends of the members 20 and 21 are each provided with an opening for the reception of the pin 29, so that the block 22 may be attached thereto, as shown in Fig. 1 and Fig. 2.

As shown in Figs. 4, 5 and 6, the respective arms are joined in pivotal relation by their respective rivets 31, 32, 33, 34, 35 and 35'. Each of the arms is provided with an opening which registers with an opening 37 and 37' formed in the side rails 12 and 12'. When these arms are in folded relation, a bolt 36 may be projected through the openings to prevent unfolding of these arms or any relative displacement of the same. These bolts 36 may be secured in position by suitable cotter pins or by being threaded into a threaded portion of the openings formed in the arms.

In use, the material to be clamped is placed between the engaging block and the swivel foot of the screw, and the screw threaded to bring about the proper clamping effect. The arms are extended through their pivotal mounting to the approximate length desired, so that the approximate distance between the engaging surfaces is obtained. The bolts 36 are then projected through the remaining arms which are still folded to prevent their relative displacement under strain. In this way, the distance between the engaging surfaces may be adjusted through an extension or folding of the connecting medium between said engaging surfaces. The portion 24 engages the under surfaces of the arms and serves to reinforce the block 22 in resisting the thrust. The portion 23 serves as a reinforcement in the same manner when the block is inverted. The block 22 may be moved along the arms 20 and 21, or the other folded arms if desired, so that a closer approximation of the adjustment may be had. To this end the arms may be provided with additional openings for the pin 29 or the openings 37 and 37' may be used. If it is desired to move the block over a number of the arms, instead of over only two as shown in the drawings, the block 22 may then be inverted and the opening 26 used.

I claim:

1. A clamp of the class described, comprising an end block; a pair of side rails secured to opposite faces of said end block adjacent one end and projecting outwardly therefrom in parallel relation to each other; a plurality of extension rails positioned between said side rails in juxtaposition to each other, the outermost pair being pivotally connected at one end to the free end of said side rails and the rest of said extension rails being alternately pivotally connected at one end to the adjacent end of an adjacent extension rail, the innermost pair of said extension rails being elongated and projecting beyond the ends of the remainder of said rails; and an abutment block mounted on said projecting ends of said rails.

2. A clamp of the class described, comprising an end block; a pair of side rails secured to said end blocks at opposite sides and projecting therefrom in parallel relation to each other; a plurality of extension rails positioned between said side rails, the end of the outer pair of said extension rails being pivotally connected to the free end of said side rails, said extension rails being pivotally connected at opposite ends alternately to adjacent extension rails on opposite sides, the innermost of said extension rails being projected at one end beyond the ends of the remainder of said extension rails; an abutment block secured to the projecting end of said inner pair of extension rails, said extension rails and said side rails being provided with registering openings for the reception of locking pins for preventing movement of said extension rails bodily relatively to said end block.

3. A clamp of the class described, comprising an end block; a pair of side rails secured to opposite sides of said end block and projecting therefrom in parallel spaced relation to each other; a screw threaded in said end block and having an engaging end projecting in the direction of the projection of said side rails; a plurality of extension rails positioned between said side rails, the outermost pair of said extension rails being pivotally connected at one end to the free end of said side rails, the opposite end of said outermost pair being pivotally connected to one end of an adjacent pair of said extension rails, said extension rails being pivotally connected alternately at opposite ends to adjacent extension rails, the innermost of said extension rails being elongated to provide a projecting portion extending beyond the ends of the rest of said extension rails; an abutment block having an opening formed therein for the reception of said projecting portion, said projecting portion and said abutment block having registering openings formed therein for the reception of fastening means, said extension rails and said side rails having registering openings formed therein for the reception of locking pins, said extension rails being adapted for folding outwardly on their points of pivotal connection for adjusting the distance between said abutment block and said end block.

In testimony whereof I have signed the foregoing.

THOMAS C. O'LOUGHLIN.